(12) United States Patent
Agawa

(10) Patent No.: US 6,564,845 B1
(45) Date of Patent: May 20, 2003

(54) TIRE FORMING MACHINE

(75) Inventor: Jiro Agawa, Nagasaki-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 105 days.

(21) Appl. No.: 09/620,603

(22) Filed: Jul. 20, 2000

(30) Foreign Application Priority Data

Jul. 23, 1999 (JP) .......................................... 11-208360
Jul. 3, 2000 (JP) ....................................... 2000-200532

(51) Int. Cl.[7] ............................................. B29D 30/26
(52) U.S. Cl. ...................... 156/403; 156/131; 156/133; 156/406.2; 156/414; 156/415
(58) Field of Search ................................. 156/133, 130, 156/123, 130.7, 131, 406.2, 415, 416, 417, 414, 403

(56) References Cited

U.S. PATENT DOCUMENTS

| | | | |
|---|---|---|---|
| 3,503,829 A | | 3/1970 | Menell et al. |
| 3,862,871 A | * | 1/1975 | Held et al. ................... 156/133 |
| 4,007,080 A | | 2/1977 | Klopper |
| 4,063,987 A | | 12/1977 | Irie et al. |
| 4,190,482 A | * | 2/1980 | Yabe .......................... 156/126 |
| 4,510,002 A | | 4/1985 | Goodfellow |
| 4,634,489 A | | 1/1987 | Dupommier |
| 5,156,713 A | * | 10/1992 | Ishii et al. ................... 156/111 |
| 5,755,922 A | | 5/1998 | Baldoni et al. |

FOREIGN PATENT DOCUMENTS

| | | |
|---|---|---|
| DE | 130201 | 11/1899 |
| DE | 1 230 201 | 12/1966 |
| GB | 1103817 | 2/1968 |
| JP | 09 131 807 A | 5/1997 |
| JP | 10113996 | 5/1998 |

OTHER PUBLICATIONS

Official Action issued by Patent Office of the Russian Federal dated Feb. 5, 2002 for Appl. No. 2000119629 with English translation.

* cited by examiner

Primary Examiner—Geoffrey L. Knable
(74) Attorney, Agent, or Firm—Alston & Bird LLP

(57) ABSTRACT

A tire forming machine is provided which includes a forming drum having a central drum portion arranged at an axially central location of the forming drum, and right and left drum portions which are arranged on either of the right and left sides of the central drum portion and which are movable in an axial direction of the forming drum. At the time of winding tire-forming materials on the forming drum to assemble a carcass, the right and left drum portions are brought into contact with the central drum portion and stuck with the same to cooperatively form a continuous surface. After the assembly of the carcass, the right and left drum portions are moved to respective bead setting positions to open the forming drum. The thus-constructed tire forming machine is comprised of a plurality of gripping mechanisms arranged around the central drum portion of the forming drum for gripping an axially central portion of the carcass.

10 Claims, 4 Drawing Sheets

TIRE FORMING MACHINE

BACKGROUND OF THE INVENTION AND RELATED ART STATEMENT

1. Field of the Invention

This invention relates to a tire forming machine which forms tires in a single stage.

2. Description of Related Art

A tire forming machine which forms tires in a single stage is provided with a forming drum like one 51 shown in FIGS. 4 and 5. The forming drum 51 is rotatably supported by a driving device (not shown) via a shaft 52 of the machine, and has a central drum portion 53 rigidly fitted to an axially central location of the drum as well as right and left drum portions 55, 54 arranged on either of the right and left sides of the central drum portion 53 and movable along the axial direction. FIG. 4 shows a state of the machine in which the right and left drum portions 55, 54 of the forming drum 51 are arranged at respective positions for setting beads (not shown).

Tires may be formed using the forming drum 51 as follows: First, various cloth-like and band-shaped tire-forming materials (not shown) are wound on the peripheral surface of the forming drum 51 as shown in FIG. 4, so as to assemble a carcass. Then, to combine these tire-forming materials along the axial direction on the forming drum 51, slender and flat support members (not shown) are once inserted into gaps S between the central drum portion 53 and the right and left drum portions 55, 54, respectively, and after the combination of the tire-forming members, the support members are removed from the respective gaps S. Next, a stitcher (not shown) is moved to stitch the carcass. The peripheral surface of the carcass is pressed to remove air remaining between the members, and at the same time the members are rigidly bonded to each other. Thereafter, known steps are carried out; i.e., beads are set to respective predetermined portions of the right and left drum portions 55, 54 by means of a supply device (not shown) and locked with some known means, and side walls of the tire-forming materials are turned up, followed by bonding a belt and a tread assembly (neither of which are shown) to the carcass. In this manner, a green tire is built.

Another tire forming method has been proposed in which, as shown in FIG. 5, the right and left drum portions 55, 54 are once moved toward the central drum portion 53 so that they come into contact with each other, and thus the forming drum 51 has a continuous surface formed thereon along the axial direction. In this state, the various cloth-like and band-shaped tire-forming materials (not shown) are wound on the peripheral surface of the forming drum 51 to assemble the carcass, and then these tire-forming materials are combined with each other on the forming drum 51 in the circumferential and axial directions. Then, the stitcher (not shown) is moved toward the forming drum 51 for stitching, and the peripheral surface of the carcass is pressed, followed by the same operations as mentioned above. Thereafter, the right and left drum portions 55, 54 are moved to open the forming drum 51, and they are returned to the bead setting positions shown in FIG. 4. Further, some known steps are carried out; i.e., the beads are set to the respective predetermined portions of the right and left drum portions 55, 54 by means of the supply device (not shown) and locked with some known means, and the side walls of the tire-forming materials are turned up, followed by bonding the belt and the tread assembly (neither of which are shown) to the carcass. In this manner, a green tire is produced.

In the conventional tire forming machines, however, when tire-forming materials are wound on the peripheral surface of the forming drum 51 under the condition of the drum shown in FIG. 4, the slender and flat support members must be inserted into the gaps S between the central drum portion 53 and the right and left drum portions 55, 54, respectively, so as to axially connect the central, right and left drum portions to each other. As a result, the workability of the machine has been poor and hence the productivity of tires cannot be improved. In addition, the workload of the insertion and removal of the support members is large and imposes a large burden on the operator. Moreover, when the gaps S are present between the central drum portion 53 and the right and left drum portions 55, 54, respectively, stitching which is done by externally pressing the entire tire-forming materials cannot be performed in a satisfactory manner. As a result, air may become confined between the layers of the tire-forming materials, causing defects, such as residual of air inside formed tires, and therefore defective tires may result.

On the other hand, when the tire-forming materials are wound on the peripheral surface of the forming drum 51 in the conventional tire forming machine as shown in FIG. 5, the central drum portion 53 is in contact with the right and left drum portions 55, 54 to form a continuous surface, and therefore combining and stitching operations of the tire-forming materials are carried out without difficulties. After the operations, however, the right and left drum portions 55, 54 must be moved to the bead setting positions to open the forming drum 51, and they must be returned to the condition shown in FIG. 4. In this case, however, the resistance force between the wound tire-forming materials and each of the right and left drum portions cannot be the same, and therefore deformation, such as entire or partial deviation or distortion, of the central line of the carcass which is obtained by assembling the tire-forming materials, may occur, resulting in defective tires. Deviations of the center may be corrected by reducing resistance on either of the right and left drum portions with air blown into the interior of the carcass when the left and right drum portions 54, 55 are moved to the set position of the beads. In reality, however, it has been difficult to maintain the central line of the carcass with precision even by this method.

OBJECT AND SUMMARY OF THE INVENTION

It is therefor an object of the invention to provide a tire forming machine which is capable of positively eliminating center deviations, deformations, or the like of a carcass assembled from tire-forming materials, so as to maintain the quality of tires while ensuring high operating efficiency.

To attain the object, the invention provides a tire forming machine having a forming drum having a central drum portion arranged at an axially central location of the forming drum, and right and left drum portions which are arranged on either of the right and left sides of the central drum portion and which are movable in an axial direction of the forming drum, the right and left drum portions being brought into contact with the central drum portion so as to cooperatively form a continuous surface at the time of winding tire-forming materials around the forming drum for assembling a carcass, the right and left drum portions being moved to respective bead setting positions to open the forming drum after the assembly of the carcass, the tire forming machine comprising a plurality of gripping mechanisms arranged around the central drum portion of the forming drum in a movable manner for gripping an axially central portion of the carcass.

As stated above, the tire forming machine according to the invention includes the forming drum having the central drum portion arranged at the axially central location of the forming drum, and the right and left drum portions arranged on either of the right and left sides of the central drum portion movably in the axial direction, the right and left drum portions being brought into contact with the central drum portion so as to cooperatively form a continuous surface at the time of winding the tire-forming materials on the forming drum to assemble the carcass, the right and left drum portions being moved to the respective bead setting positions to open the forming drum after the assembly of the carcass. The tire forming machine comprises the gripping mechanisms arranged around the central drum portion of the forming drum in a movable manner for gripping the axially central portion of the carcass. As a result, combining and stitching operations of the tire-forming materials can be smoothly carried out. Further, center deviations or deformations of the carcass can be positively prevented while the operational efficiency is ensured. Therefore, tires with high quality can be produced and the productivity thereof can be enhanced.

BRIEF DESCRIPTION OF THE DRAWINGS

These and other objects and advantages of the present invention will become clear from the following description with reference to the accompanying drawings, wherein:

FIGS. 3(a) and 3(b) each show a state in which one of the gripping mechanisms of FIG. 2 is mounted on a frame of a bead setter of the machine, wherein:

FIG. 3(a) is a plan view showing the state; and

FIG. 3(b) is a front view showing the same state;

DESCRIPTION OF THE PREFERRED EMBODIMENTS

Figure 1:
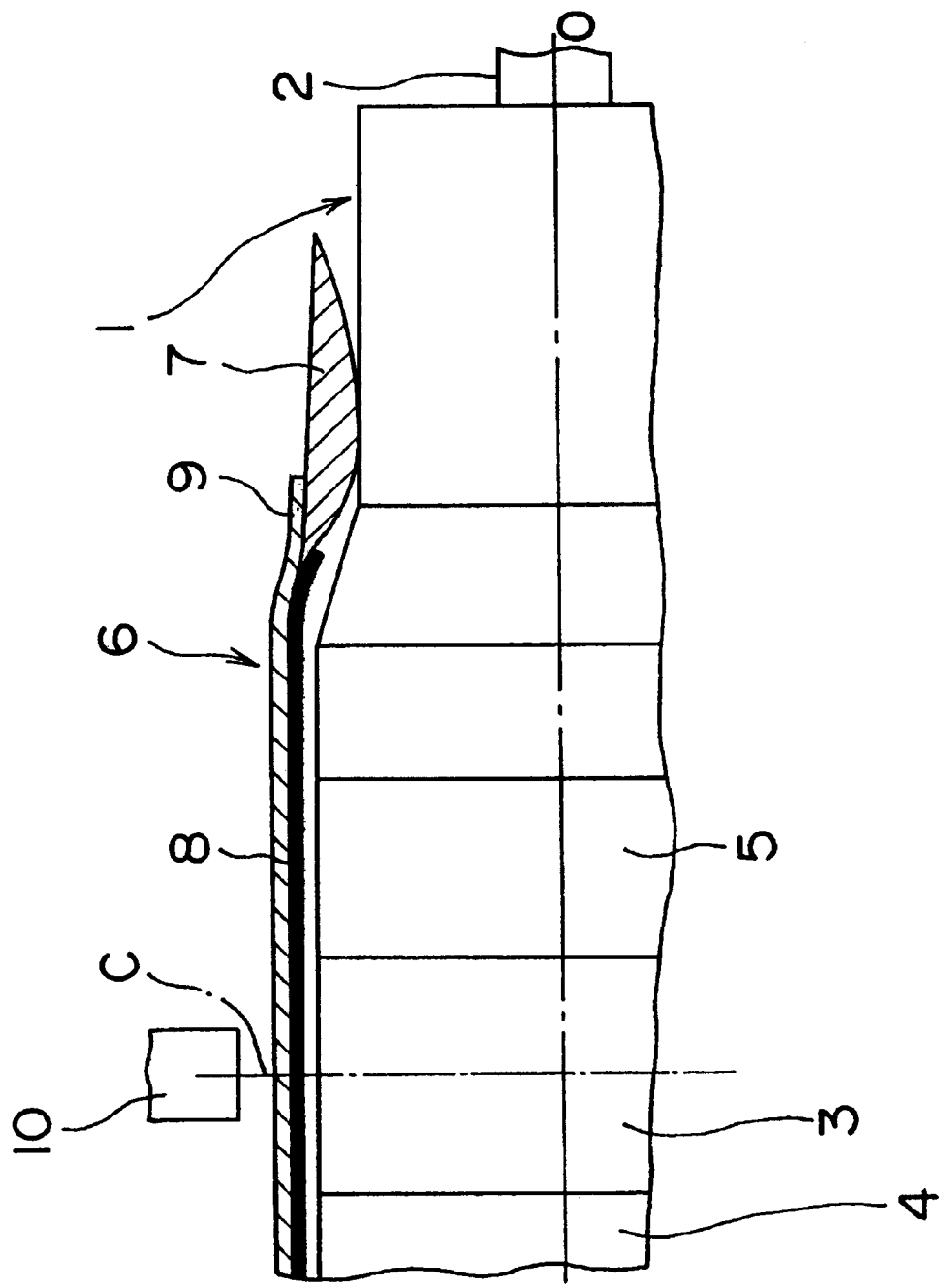
FIG. 1 is a front view schematically showing the construction of a tire forming machine according to an embodiment of the invention.
Figure 2:
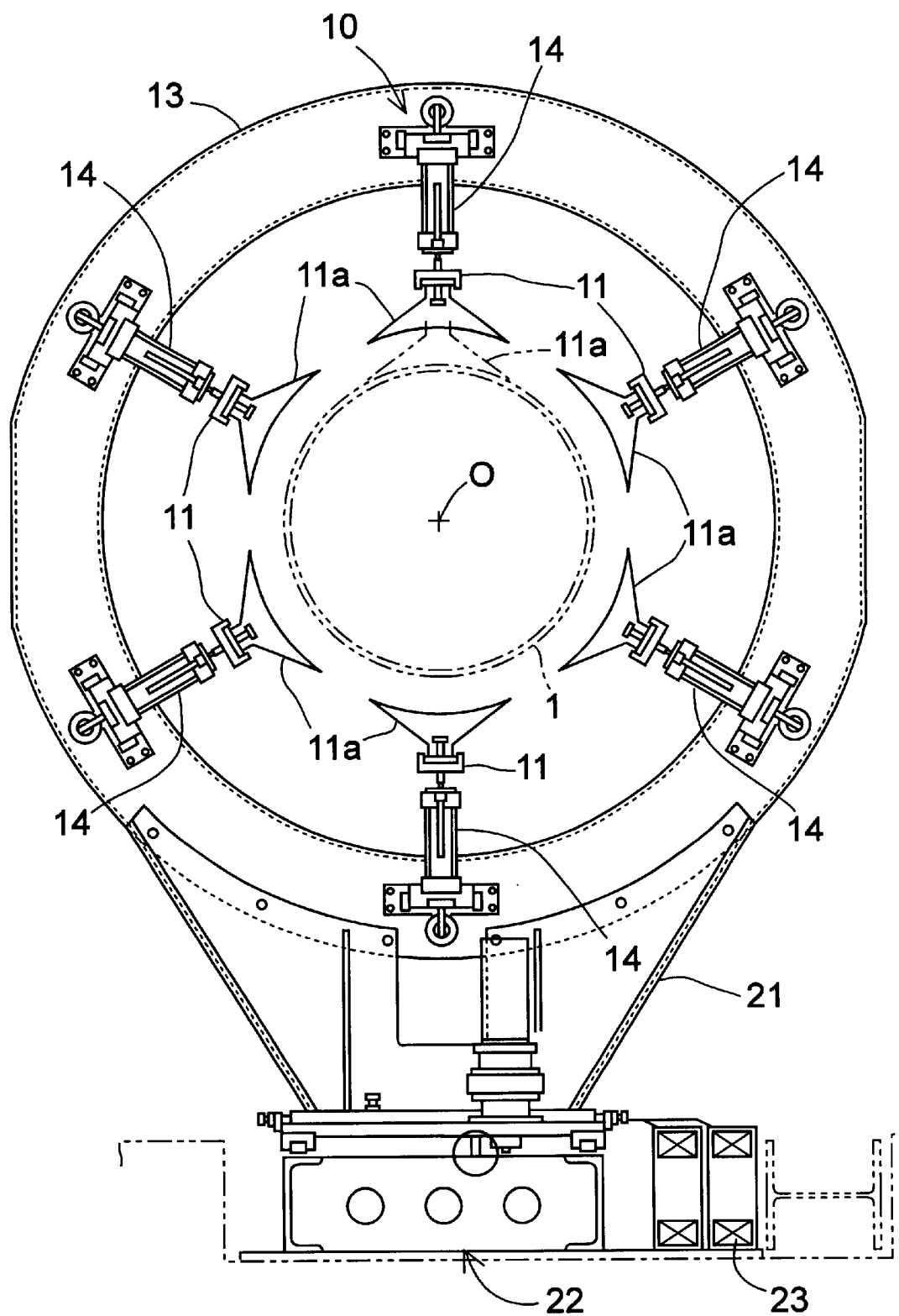
FIG. 2 is a side view showing the construction of gripping mechanisms of the tire forming machine and the vicinity of the same, according to the embodiment.

The invention will no,w be described in detail with reference to the drawings showing an embodiment thereof. In the drawings, FIG. 1 is a front view schematically showing the construction of a tire forming machine according to the embodiment of the invention, FIG. 2 a side view showing gripping mechanisms of the tire forming machine of the embodiment and the vicinity of the same, FIG. 3(a) a plan view showing a state in which one of the gripping mechanisms of FIG. 2 is mounted on a frame of a bead setter of the machine, and FIG. 3(b) a front view showing the same state, respectively.

The tire forming machine according to the embodiment of the invention is not of two-stage type but of single-stage type. With the two-stage type, a tire is built by using a first former for forming a cylindrical carcass by winding thereon tire-forming materials, and a second former for forming a green tire by shaping the cylindrical carcass into a donut shape. On the other hand, the tire forming machine of the present embodiment, which forms green tires in a single stage, is provided with a forming drum 1, as shown in FIG. 1, which basically has a similar construction as the one discussed in connection with the conventional machines. The right end of the forming drum 1 is rotatably supported by a driving device and a support frame (neither of which are shown) via a shaft 2 of the machine.

The forming drum 1 has a central drum portion 3 rigidly fitted at an axially central location of the drum 1, and right and left drum portions 5, 4 which are arranged on either of the right and left sides of the central drum portion 3 movably along the axial direction. Further, when cloth-like and band-shaped tire-forming materials are wound around the forming drum 1, the right and left drum portions 5, 4 approach the central drum portion 3 to come into contact with the same, and thus they are abutted with each other such that the surface of the forming drum 1 becomes continuous without gaps in the axial direction. A carcass 6 is assembled on the continuous peripheral surface of the machine 1 thus formed. After the assembly of the carcass 6, the right and left drum portions 5, 4 are moved to respective bead setting positions (not shown) to thereby open the forming drum 1.

The tire-forming materials wound around the surface of the forming drum 1 include a pair of right and left side walls 7, a plurality of inner liners 8, and a plurality of plies 9 disposed in this order from the inner side. These tire-forming materials are combined and stitched with each other on the surface of the forming drum 1, so as to form the cylindrical carcass 6.

On the other hand, as shown in FIG. 2, a rail portion 22 is arranged under the forming drum 1 in parallel with the forming drum 1. Further, a leg portion 21 which supports a frame 13 of a bead setter is mounted on the rail portion 22 so that the leg portion 21 can run through the same in right and left directions. Reference numeral 23 designates a convoluted portion which houses cables and tubes for supplying electric power, signals, and air pressure to the frame 13 of the bead setter.

Figure 3:
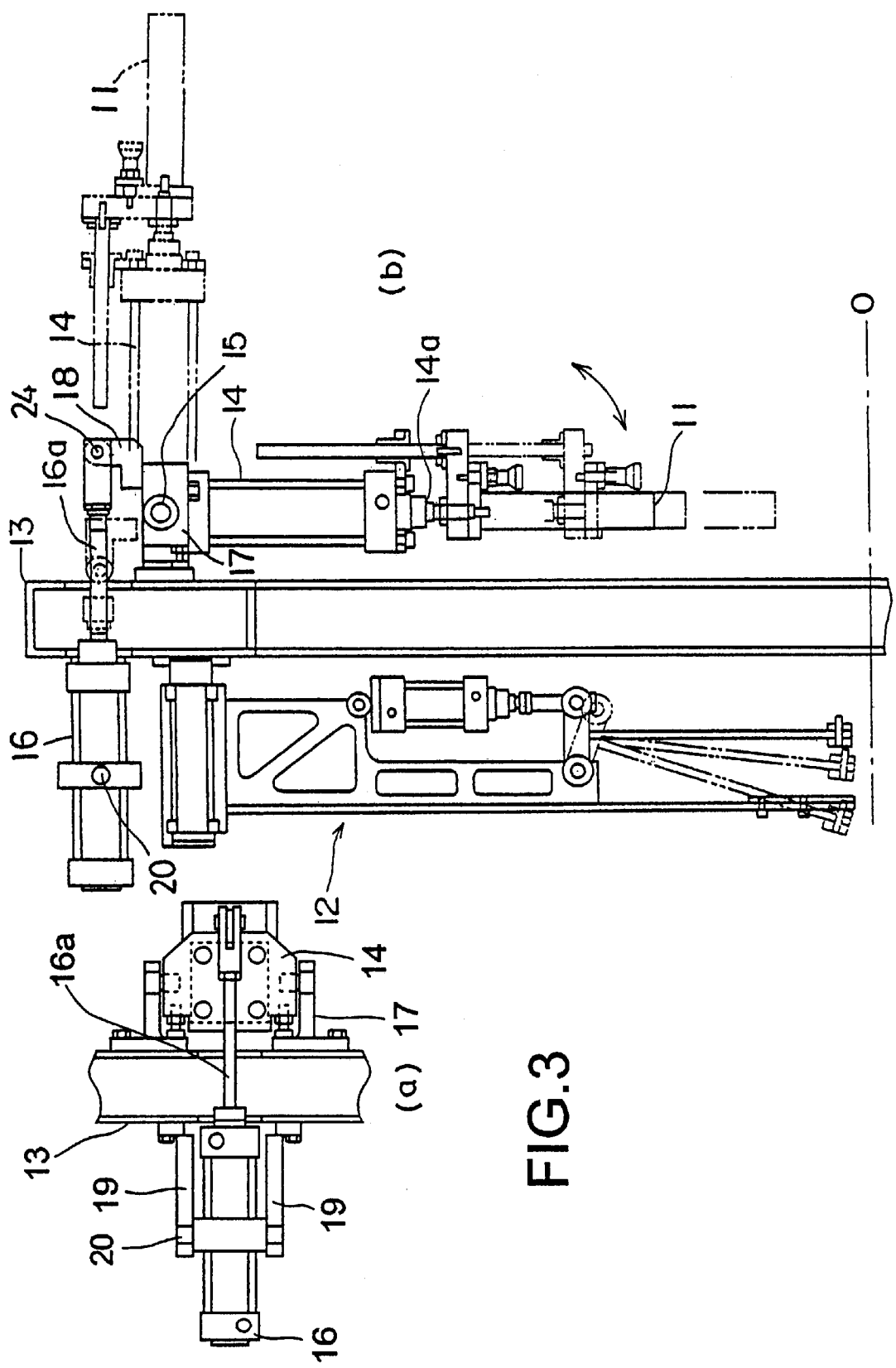

As shown in FIGS. 2, 3(a), and 3(b), the frame 13 of the bead setter is formed like a ring with its internal diameter larger than the external diameter of the forming drum 1, and is arranged outside the forming drum 1. Further, the frame 13 is moved in parallel with the forming drum 1 over the rail portion 22 in the right and left directions, while maintaining a space with respect to the forming drum 1.

Here, the bead setter 12 grips and conveys a bead which is one of the tire-forming materials, and is mounted on the left side of the frame 13.

In this connection, another bead setter, a frame of the bead setter, and another leg portion (neither of which are shown) are mounted on the rail portion 22 on the right side of the forming drum 1 in such a manner that they can move in the right and left directions with axial symmetry with respect to the counterparts shown in FIGS. 3(a) and 3(b). Electric power, signals and air pressure are supplied to the frame of the bead setter via the cables and tubes housed in the convoluted portion 23.

Disposed around the forming drum 1 are a plurality of (six in the embodiment) gripping mechanisms 10 for gripping an axially central portion C of the carcass 6 when the right and left drum portions 5, 4 are moved to the bead setting positions, not shown (i.e. when the forming drum 1 is opened). The gripping mechanisms 10 are arranged on the right side of the frame 13 of the bead setter at regular intervals along the circumferential direction of the forming drum 1. The gripping mechanisms 10 are each constructed so as to reciprocate, together with the frame 13 of the bead setter, between the central drum portion 3 and a standby position (not shown) and to be rotatable in the horizontal direction. Therefore, in the tire forming stage, the mechanisms 10 are moved to the respective standby positions so as not to interfere with the tire forming operations.

To this end, as shown in FIGS. 2, 3(a), and 3(b), each gripping mechanism 10 is provided with a gripping member 11, and first and second air cylinders 14, 16.

More specifically, as shown in FIG. 3(b), a pair of pin support stands 17 are mounted on the right side of the frame 13 of the bead setter by means of bolts, nuts, etc., and the first air cylinder 14 has its rear portion rotatably disposed on the pin support stands 17 by means of a pivoting pin 15. Further, a support arm 18 is secured to the rear end of the first air cylinder 14.

The first air cylinder 14 includes a piston rod 14a, and the gripping member 11 is linked to the front end of the piston rod 14a. These gripping members 11 are arranged in a manner facing each other while securing a space for the central drum portion 3 of the forming drum 1. Each griping member 11 has a front end 11a thereof which is formed like a circular arc (truncated cone) conforming to the peripheral surface of the central drum portion 3, in order to positively grip the carcass 6 from the outside. Further, the front end 11a of the gripping member 11 is, as indicated by the two-dot-dash lines in FIGS. 2 and 3(b), radially movable with respect to the shaft center O of the central drum portion 3 of the forming drum 1 by expansion and contraction of the piston rod 14a.

Mounted on the left side of the frame 13 of the bead setter are a pair of stays 19 by means of bolts, nuts, etc., whereby the second air cylinder 16 is disposed in a manner being generally in parallel with the shaft center O of the forming drum 1. The central portion of the second air cylinder 16 is rotatable with respect to the stays 19 by means of a pivoting pin 20. The support arm 18 at the rear end of the first air cylinder 14 is linked to the front end of a piston rod 16a of the second air cylinder 16 by means of a pivoting pin 24.

As stated hereinabove, in the present embodiment, the first air cylinder 14 is rotatably linked to the piston rod 16a of the second air cylinder 16 which is another driving means, via the pivoting pin 15 as a rotating fulcrum, and the support arm 18. As indicated by an arrow in FIG. 3(b), the gripping member 11 and the first air cylinder 14 are rotated upward and downward about the pivoting pin 15 by expansion and contraction of the piston rod 16a, and therefore the gripping member 11 and the first air cylinder 14 can be arranged along the axial direction of the forming drum 1 when the gripping mechanism 10 is at the standby position (not shown).

More specifically, if the gripping mechanism 10 is required only to perform the gripping operation with respect to the carcass 6, it is sufficient that the mechanism 10 is moved only by a small stroke in the radial direction. However, when the other forming steps are taken into consideration, the mechanism 10 actually requires a considerable space for receding. If this considerable space is coped with only by expanding the stroke of the piston rod 14a of the first air cylinder 14, the dimension of the tire forming machine would be enlarged in the radial direction, which is not desirable. To overcome the inconvenience, in the present embodiment, the gripping member 11 and the first air cylinder 14 are rotated in a direction at right angles to the gripping direction by the second air cylinder 16, as indicated by the two-dot-dash line in FIG. 3(b), and therefore they can recede in the axial direction of the forming drum 1.

Next, an operation of the tire forming machine of the embodiment will be described below.

First, the right and left drum portions 5, 4 are brought into contact with the central drum portion 3, whereby the peripheral surface of the forming drum 1 is rendered continuous along the axial direction. In this state, the side walls 7, the inner liners 8, and the plies 9 which are the tire-forming materials are sequentially wound on the peripheral surface of the forming drum 1 to assemble the cylindrical carcass 6, and at the same time these tire-forming materials 7, 8, 9 are bonded to and combined with each other along the circumferential and axial directions. Then, a stitcher (not shown) is moved from underneath to the forming drum 1 to carry out stitching of the carcass. Further, air remaining between the tire-forming materials is removed by pressing the peripheral surface of the carcass 6 by means of a rotary roller, and at the same time the tire-forming materials are rigidly bonded to each other. On this occasion, the bead setter 12 and the frame 13 thereof, and the bead setter and the frame thereof on the right side (neither of which are shown) are at the respective standby positions at which they do not interfere with the tire forming operations, and therefore they are not at the respective bead setting positions.

Then, to convey each gripping mechanism 10 to the position corresponding to the axially central line of the central drum portion 3 of the forming drum 1, the frame 13 of the bead setter is moved along the rail portion 22 by means of a driving mechanism (not shown) (see FIG. 1). In this state, the piston rod 16a of each second air cylinder 16 is expanded to rotate the corresponding first air cylinder 14 assuming the horizontal position in the direction orthogonal to the shaft center O.

In regard of this point, the frame 13 of the bead setter may be moved after the first air cylinder 14 is rotated in the direction orthogonal to the shaft center O.

Next, the piston rod 14a of the first air cylinder 14 is expanded to move each gripping member 11 toward the shaft center O of the forming drum 1. Then, the front end 11a is pressed onto the peripheral surface of the carcass 6, whereby the axially central portion C of the carcass 6 is gripped. That is, the axially central portion C of the carcass 6 is pinched by the gripping members 11 and the peripheral surface of the central drum portion 3.

Figure 4:
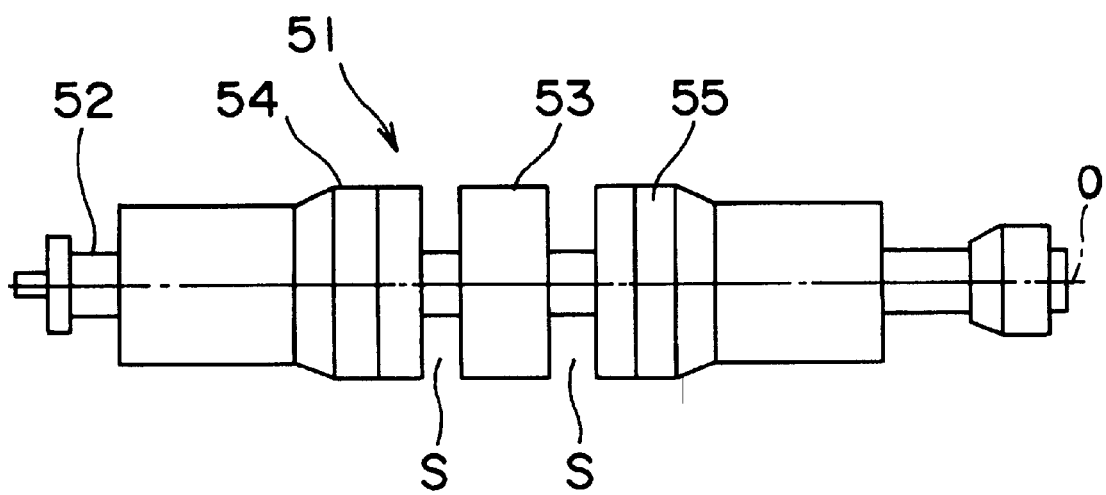
FIG. 4 is a front view showing the construction of a forming drum of a conventional tire forming machine, in which right and left drum portions of the forming drum are separated from a central drum portion to be placed at respective bead setting positions.
Figure 5:
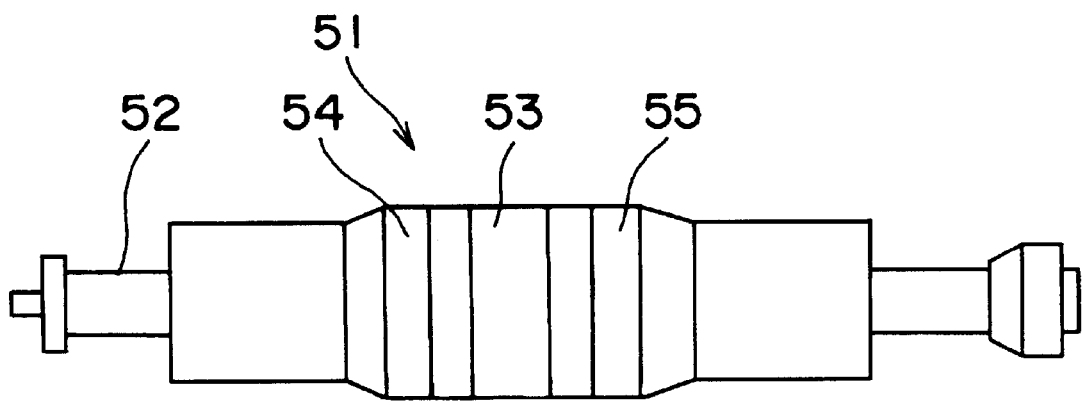
FIG. 5 is a front view showing the construction of the forming drum of the conventional tire forming machine, in which the right and left drum portions are in contact with the central drum portion to form a continuous surface.

In this manner, while the deviation of the axially central portion C of the carcass 6 is prevented, the right and left drum portions 5, 4 are moved in the respective directions that separate from the central drum portion 3 to open the forming drum 1, and returned to the bead setting positions shown in FIG. 4. Thereafter, the piston rod 14a of the first air cylinder 14 is contracted, and the front end 11a of each gripping member 11 is moved in the radially external direction, to thereby separate the gripping member 11 from the forming drum 1. Then, the piston rod 16a of the second air cylinder 16 is contracted, to thereby horizontally rotate the first air cylinder 14.

Next, the frame 13 of the bead setter 12 is moved along the rail portion 22 to the bead setting position. The frame of the right-side bead setter (not shown) is also moved to the other bead setting position.

In this state, known forming steps are carried out, i.e. the bead setter 12 and the right-side bead setter (not shown) are operated to set the right and left beads to predetermined portions of the respective right and left drum portions 5, 4, and to lock the beads by known means, and the side walls 7 are turned up, followed by bonding a belt and a tread assembly (neither of which are shown) to the carcass 6. In this manner, the green tire is built.

In the tire forming machine according to the embodiment, when the right and left drum portions 5, 4 are moved to the bead setting positions, i.e. when the forming drum 1 is opened, the axially central portion C of the carcass 6 is gripped by the gripping mechanisms 10, and therefore deformation, such as center deviation or distortion, of the carcass 6, which have occurred in tires built by the conventional forming machines, can be prevented, leading to improved tire quality. Further, in the present embodiment, the second air cylinder 16 is provided for rotating each gripping member 11 and each first air cylinder 14. Therefore, when the gripping mechanism 10 is at the standby position, the gripping member 11 and the first air cylinder 14 are arranged along the axial direction of the forming drum 1. As a result, the machine can be quickly shifted to the other forming steps while avoiding upsizing thereof. In addition, since the gripping mechanisms 10 are mounted on the frame 13 which is the component part of the bead setter 12 positioned on one side of the forming drum 1, the machine can be minimized and the axially driving means can be commonly used, leading to curtailment of costs.

Although the invention has been described with reference to the preferred embodiment of the invention, this is not limitative, and various variations and modifications may be made thereto within the scope and spirit of the present invention. For example, in the present embodiment, the second air cylinder 16 is used for rotating the gripping member 11 and the first air cylinder 14, to thereby arrange the gripping member 11 and the first air cylinder 14 along the shaft center O of the forming drum 1 when the gripping mechanism 10 is at the standby position. As a result, they recede in order not to be a hindrance to the other forming steps. But this is not limitative. Alternatively, the gripping member 11 and the first air cylinder 14 may be manually rotated, and bound to the frame 13 of the bead setter 12 by means of wire or the like.

Further, in the above described embodiment, the gripping mechanisms 10 each formed by the gripping member 11, the first air cylinder 14, and the second air cylinder 16 are mounted on the frame 13 of the bead setter disposed on the left side of the forming drum 1, but this is not limitative. Alternatively, the gripping mechanisms 10 may be mounted on the frame of the right-side bead setter (not shown).

What is claimed is:

1. A tire forming machine for forming at least a carcass from tire-forming materials, the machine comprising:
    a forming drum including a central drum portion arranged at an axially central location of the forming drum, and right and left drum portions which are respectively arranged on right and left sides of the central drum portion, wherein the right and left drum portions are movable in an axial direction of the forming drum for:
        contacting the central drum portion so as to cooperatively form a continuous surface while the tire-forming materials are wound around the forming drum to assemble a carcass, and
        opening the forming drum by moving to respective bead setting positions after the assembly of the carcass;
    at least one bead setter including a frame mounted for moving in the axial direction of the forming drum;
    a plurality of gripping mechanisms mounted to the frame of the bead setter for being arranged around the central drum portion, with each of the gripping mechanisms including a gripping member mounted for moving radially toward and away from a center of the central drum portion while the gripping mechanisms are arranged around the central drum portion, wherein the gripping members are circumferentially arranged at intervals, each of the gripping members has an end that is operative for gripping an axially central portion of the carcass while the carcass is upon the central drum portion, and each of the ends is shaped like a circular are at least generally conforming to a peripheral surface of the central drum portion, wherein for each of the gripping members, the end is mounted for pivoting about a pivot axis that extends transversely to the axial direction of the forming drum, so that the end can be pivoted about the pivot axis between inner and outer positions, with the end being closer to the central drum portion in the inner position than in the outer position; and
    an actuator operative for driving at least one of the gripping members radially toward the center of the central drum portion while the carcass is upon the central drum portion so that the carcass is pinched between the central drum portion and the end of the driven gripping member in a manner which restricts deformation of a central portion of the carcass during the opening of the forming drum.

2. A tire forming machine according to claim 1, wherein for each gripping mechanism, the gripping mechanism further includes an actuator rotatably connected to the gripping member for pivoting the end of the gripping member between the inner and outer positions.

3. A tire forming machine according to claim 1, wherein for each gripping mechanism, the gripping mechanism further includes:
    a first actuator connected to the gripping member for pivoting the end of the gripping member between the inner and outer positions, and
    a second actuator for moving the end of the gripping member radially with respect to the center of the central drum portion while the end of the gripping member is in the inner position.

4. A tire forming machine according to claim 3, wherein for each gripping mechanism, the first actuator is rotatably connected to the gripping member.

5. A tire forming machine for forming at least a carcass from tire-forming materials, the machine comprising:
    a forming drum including a central drum portion arranged at an axially central location of the forming drum, and right and left drum portions which are respectively arranged on right and left sides of the central drum portion, wherein the right and left drum portions are movable in an axial direction of the forming drum for:
        contacting the central drum portion so as to cooperatively form a continuous surface while the tire-forming materials are wound around the forming drum to assemble a carcass, and
        opening the forming drum by moving to respective bead setting positions after the assembly of the carcass;
    a plurality of gripping mechanisms for being arranged around the central drum portion, with each of the gripping mechanisms including a gripping member having an end that is operative for gripping an axially central portion of the carcass while the carcass is upon the central drum portion, and each of the ends is shaped like a circular arc conforming to a peripheral surface of the central drum portion, wherein the gripping members are circumferentially arranged at intervals, and wherein for each gripping member, the end is mounted for:

pivoting about a pivot axis that extend transversely to the axial direction of the forming drum, so that the end can be pivoted about the pivot axis between inner and outer positions, with the end being closer to the central drum portion in the inner position than in the outer position, and moving radially with respect to a center of the central drum portion while the end is in the inner position.

6. A tire forming machine according to claim 5, wherein for each gripping mechanism, the gripping mechanism further includes a first actuator rotatably connected to the gripping member for pivoting the end of the gripping member between the inner and outer positions.

7. A tire forming machine according to claim 5, wherein for each gripping mechanism, the gripping mechanism further includes:

a first actuator connected to the gripping member for pivoting the end of the gripping member between the inner and outer positions, and a second actuator for moving the end of the gripping member radially with respect to the center of the central drum portion while the end of the gripping member is in the inner position.

8. A tire forming machine according to claim 7, wherein for each gripping mechanism, the first actuator is rotatably connected to the gripping member.

9. A tire forming machine according to claim 7, wherein for each gripping mechanism, the second actuator is operative for driving the end of the gripping member radially toward the center of the central drum portion while the carcass is upon the central drum portion so that the carcass is pinched between the central drum portion and the end of the gripping member in a manner which restricts deformation of a central portion of the carcass during the opening of the forming drum.

10. A tire forming machine according to claim 5, further comprising an actuator operative for driving at least one of the gripping members radially toward the center of the central drum portion while the carcass is upon the central drum portion so that the carcass is pinched between the central drum portion and the end of the gripping member that is driven by the actuator in a manner which restricts deformation of a central portion of the carcass during the opening of the forming drum.

* * * * *

UNITED STATES PATENT AND TRADEMARK OFFICE
CERTIFICATE OF CORRECTION

PATENT NO. : 6,564,845 B1
DATED : May 20, 2003
INVENTOR(S) : Agawa

It is certified that error appears in the above-identified patent and that said Letters Patent is hereby corrected as shown below:

<u>Column 8,</u>
Line 13, "are" should read -- arc --.

Signed and Sealed this

Fifteenth Day of July, 2003

JAMES E. ROGAN
*Director of the United States Patent and Trademark Office*